United States Patent [19]
Fletcher et al.

[11] Patent Number: 5,798,186
[45] Date of Patent: Aug. 25, 1998

[54] METHOD AND APPARATUS FOR COMMENCING OPERATION OF A FUEL CELL ELECTRIC POWER GENERATION SYSTEM BELOW THE FREEZING TEMPERATURE OF WATER

[75] Inventors: Nicholas J. Fletcher, Vancouver, Canada; Gustav A. Boehm, Ueberlingen, Germany; Eric G. Pow, Vancouver, Canada

[73] Assignee: Ballard Power Systems Inc., Burnaby, Canada

[21] Appl. No.: 659,921

[22] Filed: Jun. 7, 1996

[51] Int. Cl.$^6$ .................................... H01M 8/04
[52] U.S. Cl. ....................... 429/13; 429/26; 429/34
[58] Field of Search ........................ 429/13, 26, 34, 429/120

[56] References Cited

U.S. PATENT DOCUMENTS

| | | | |
|---|---|---|---|
| 5,041,344 | 8/1991 | Kamoshita et al. | 429/26 |
| 5,082,753 | 1/1992 | Shimizu et al. | 429/26 |
| 5,230,966 | 7/1993 | Voss et al. | 429/26 |
| 5,262,249 | 11/1993 | Beal et al. | 429/26 |
| 5,482,790 | 1/1996 | Yamada et al. | |
| 5,503,944 | 4/1996 | Meyer et al. | 429/13 |

OTHER PUBLICATIONS

"Environmental Testing Of SPE Fuel Cell Assemblies", *Proceedings of the 29th Power Sources Conference*, Jun. 9–12, 1980, Adlhart.

"Temperature Dependence Of Water Content And Proton Conductivity In Polyperfluorosulfonic Acid Membranes", *Journal of Membrane Science*, vol. 32, pp. 313–328, Rieke et al., 1987. No month.

"Freezing And Nonfreezing Water In Charged Membranes", *Journal of Membrane Science*, vol. 38, pp. 175–183, Tasaka et al., 1988. No month.

"Behavior of water in perfluorinated ionomer membranes containing various monovalent cations", *Journal of Membrane Science*, vol. 68, pp. 1–10, Yoshida et al., 1992. No month.

"Endurance Testing Of Low Pt Loading Polymer Electrolyte Fuel Cells", *Proceedings of the Electrochemical Society*, vol. 94, No. 23, pp. 145–156, Wilson et al., 1994. No month.

"Studies of Water in Nafion Membranes Using Deuteron and Oxygen–17 Nuclear Magnetic Resonance, and Dielectric Relaxation Techniques", *J. Electrochem. Soc.*, vol. 140, No. 4, pp. 889–895, Chen et al., Apr. 1993.

"Determination Of Water Content And Resistivity Of Perfluorosulfonic Acid Fuel Cell Membranes"*Mat. Res. Soc. Symp. Proc.*, vol. 393, pp. 157–162, Sen et al., 1995. No month.

"Conductance of Nafion 117 membranes as a function of temperature and water content", *Solid State Ionics*, vol. 77, pp. 65–69, Cappadonia et al., 1995. No month.

*Primary Examiner*—Anthony Skapars
*Attorney, Agent, or Firm*—McAndrews, Held & Malloy, Ltd.

[57] ABSTRACT

A method and apparatus are provided for starting and operating an electric power generation system comprising an electrochemical fuel cell stack for supplying electric current to an external electrical circuit. The stack comprises at least one fuel cell comprising a membrane electrode assembly comprising an anode, a cathode, and a water permeable ion exchange membrane interposed between the anode and the cathode. A fuel stream and an oxidant stream are each flowable to the fuel cell. At least a portion of the membrane electrode assembly has a temperature below the freezing temperature of water. The supply of electric current to the external circuit from the fuel cell stack is commenced such that the temperature of the membrane electrode assembly exceeds the freezing temperature of water.

27 Claims, 6 Drawing Sheets

METHOD AND APPARATUS FOR COMMENCING OPERATION OF A FUEL CELL ELECTRIC POWER GENERATION SYSTEM BELOW THE FREEZING TEMPERATURE OF WATER

FIELD OF THE INVENTION

The present invention relates to electrochemical fuel cells. More particularly, the present invention relates to a method and apparatus for commencing operation of an electric power generation system which includes a fuel cell stack having a core temperature below the freezing temperature of water.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit.

At the anode, the fuel stream moves through the porous anode substrate and is oxidized at the anode electrocatalyst layer. At the cathode, the oxidant stream moves through the porous cathode substrate and is reduced at the cathode electrocatalyst layer to form a reaction product.

In fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

Anode reaction: $H_2 \rightarrow 2H^+ + 2e$

Cathode reaction: $1/2 O_2 + 2H^+ + 2e \rightarrow H_2O$

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell. Separator plates typically do not have flow passages formed in the surfaces thereof, but are used in combination with an adjacent layer of material which provides access passages for the fuel and oxidant to the respective anode and cathode electrocatalyst, and provides passages for the removal of reaction products. The preferred operating temperature range for solid polymer fuel cells is typically 50°–120° C.

Two or more fuel cells can be electrically connected together in series to increase the overall power output of the assembly. In series arrangements, one side of a given fluid flow field or separator plate can serve as an anode plate for one cell and the other side of the fluid flow field or separator plate can serve as the cathode plate for the adjacent cell. Such a multiple fuel cell arrangement is referred to as a fuel cell stack, and is usually held together in its assembled state by tie rods and end plates. The stack typically includes inlet ports and manifolds for directing the fluid fuel stream (such as substantially pure hydrogen, methanol reformate or natural gas reformate, or a methanol-containing stream in a direct methanol fuel cell) and the fluid oxidant stream (such as substantially pure oxygen, oxygen-containing air or oxygen in a carrier gas such as nitrogen) to the individual fuel cell reactant flow passages. The stack also commonly includes an inlet port and manifold for directing a coolant fluid stream, typically water, to interior passages within the stack to absorb heat generated by the fuel cell during operation. The stack also generally includes exhaust manifolds and outlet ports for expelling the depleted reactant streams, and the reaction products such as water, as well as an exhaust manifold and outlet port for the coolant stream exiting the stack. In a power generation system various fuel, oxidant and coolant conduits carry these fluid streams to and from the fuel cell stack.

When an electrical load (comprising one or more load elements) is placed in an electrical circuit connecting the electrodes, the fuel and oxidant are consumed in direct proportion to the electrical current drawn by the load, which will vary with the ohmic resistance of the load.

Solid polymer fuel cells generally employ perfluorosulfonic ion exchange membranes, such as those sold by DuPont under its NAFION trade designation and by Dow under the trade designation XUS 13204.10. When employing such membranes, the fuel and oxidant reactant streams are typically humidified before they are introduced to solid polymer fuel cells so as to facilitate proton transport through the ion exchange membrane and to avoid drying (and damaging) the membrane separating the anode and cathode of each cell.

Each reactant stream exiting the fuel cell stack generally contains water. The outlet fuel stream from the anodes generally contains water added to humidify the stream plus any product water drawn across the membrane from the cathode. The outlet oxidant stream from the cathodes generally contains water added to humidify the stream plus product water formed at the cathode.

In some fuel cell applications, such as, for example, motive applications, it may be necessary or desirable to commence operation of a solid polymer electrolyte fuel cell stack having a core temperature below the freezing temperature of water. As used herein, the freezing temperature of water means the freezing temperature of free water, that is, 0° C. at 1 atmosphere. In this regard, it would be convenient and would simplify the system hardware if operation of the fuel cell stack could be commenced below the freezing temperature of water, without the need to first heat the fuel cell stack using an external source.

SUMMARY OF THE INVENTION

A method and apparatus for commencing operation of a fuel cell electric power generation system from below the freezing temperature of water are provided. Also, a method and apparatus for ceasing operation of a fuel cell electric power generation system and subsequently commencing operation of the system from below the freezing temperature of water are provided.

In a method for commencing operation of a fuel cell electric power generation system from below the freezing temperature of water, an electric power generation system comprises a fuel cell stack connectable to an external electrical circuit for supplying electric current to the external circuit. The fuel cell stack comprises at least one fuel cell, the at least one fuel cell comprising a membrane electrode assembly comprising an anode, a cathode, and a water permeable ion exchange membrane interposed between the anode and the cathode, at least a portion of the membrane electrode assembly having a temperature below the freezing temperature of water. The system further comprises a fuel reactant stream and an oxidant reactant stream, each of the reactant streams being flowable to the fuel cell stack. The method comprises the step of:

supplying electric current from the fuel cell stack to the external circuit such that the temperature of the portion of the membrane electrode assembly exceeds the freezing temperature of water.

In a preferred method, the step of supplying electric current from the fuel cell stack to the external circuit comprises decreasing the effective resistance of the circuit. The lower the effective resistance of the external circuit the greater the current supplied by the fuel cell stack. The effective resistance of the external circuit may be decreased, for example, by inclusion of one or more load elements connected in parallel in the circuit, or by varying the duty cycle of a pulse-width modulation device connected in the circuit. In one embodiment of the method, the effective resistance of the external circuit may be decreased so the fuel cell stack is effectively short circuited for a period of time. In general, any preferred current-time profile may be used, for example gradual or stepwise increases in the current supplied by the fuel cell stack, supplying current pulses, decreasing the current from the initial value, or supplying a fluctuating current. In a typical embodiment of the method, the step further comprises increasing the flow rate of at least one of the reactant streams. As the fuel cell stack supplies more current to the external circuit it consumes more reactants. Typically the flow rate of the reactant streams is adjusted so that the flow rate is always sufficient to meet the current demanded by the external circuit, and the fuel cell is not "starved" of either of the reactants. In one embodiment, the external circuit comprises electrical heating means, such as a resistor, for heating at least a portion of the fuel cell stack, thus in a preferred method the fuel cell stack supplies electric current to electrical heating means for raising the operating temperature of the fuel cell stack. The electrical heating means may heat the stack directly or indirectly. In a further embodiment, a battery also supplies electric current to the electrical heating means.

In another embodiment of the method, the power generation system further comprises a coolant fluid stream flowable in thermal contact with the fuel cell stack; the electrical heating means may be used to heat the coolant fluid stream, and thereby raise the temperature of the stack. The coolant fluid stream may be water or a liquid or solution which does not freeze at the freezing temperature of water. In further embodiments, the electrical heating means comprises at least one conduit formed from electrically conductive material, the at least one conduit carrying at least one of the reactant streams or preferably the coolant stream in the power generation system. Where the power generation system comprises a coolant fluid stream comprising water, and the stack comprises at least one passage for flowing the coolant stream, the at least one passage preferably has compliant means associated therewith for accommodating the expansion of freezing water within the at least one passage.

In a method of ceasing operation of a fuel cell electric power generation system and subsequently commencing operation of the system from below the freezing temperature of water, an electric power generation system comprises a fuel cell stack connectable to an external electrical circuit for supplying electric current to the external circuit. The stack comprises at least one fuel cell, the at least one fuel cell comprising a membrane electrode assembly comprising an anode, a cathode, and a water permeable ion exchange membrane interposed between the anode and the cathode. The system further comprises a fuel reactant stream and an oxidant reactant stream, each of the reactant streams being flowable to the fuel cell stack. The method comprises the sequential steps of:

(a) interrupting the supply of electric current from the fuel cell stack to the external circuit;

(b) reducing the temperature of at least a portion of the membrane electrode assembly to below the freezing temperature of water;

(c) commencing the supply of electric current to the external circuit from the fuel cell stack, in which the temperature of at least a portion of the membrane electrode assembly is below the freezing temperature of water, such that the temperature of that portion exceeds the freezing temperature of water.

In a preferred method, the step of interrupting the supply of electric current from the fuel cell stack to the external circuit comprises increasing the resistance of the circuit. In an embodiment of this step, the external electrical circuit is disconnected. In a typical embodiment of the method, the step further comprises decreasing the flow rate of at least one of the reactant streams.

Where the fuel cell stack further comprises a fuel reactant stream inlet, a fuel reactant stream outlet, a fuel reactant stream passage fluidly interconnecting the fuel reactant stream inlet and the fuel reactant stream outlet, an oxidant reactant stream inlet, an oxidant reactant stream outlet, and an oxidant reactant stream passage fluidly interconnecting the oxidant reactant stream inlet and the oxidant reactant stream outlet, the method preferably comprises an additional step between step (a) and step (b). The additional step comprises purging water from at least one, and preferably both, of the reactant stream passages. Preferably water is purged from the at least one reactant passage by circulating a gas stream through the passage.

Where the fuel cell stack further comprises a passage for flowing a coolant stream comprising water, the method preferably comprises an additional step between step (a) and step (b). The additional step comprises purging water from the coolant stream passage. Preferably water is purged from the coolant passage by circulating a gas stream through the passage.

A freeze tolerant fuel cell electric power generation system comprises a fuel cell stack connectable to an external electrical circuit for supplying electric current to the external circuit. The stack comprises at least one fuel cell, the at least one fuel cell comprising a membrane electrode assembly comprising an anode, a cathode, and a water permeable ion exchange membrane interposed between the anode and the cathode. The stack further comprises at least one passage for flowing a coolant stream comprising water, the at least one coolant passage having compliant means associated therewith for accommodating the expansion of freezing water within the at least one coolant passage. A fuel reactant stream and an oxidant reactant stream, are each flowable to the fuel cell stack. Where the stack further comprises a fuel reactant stream inlet, a fuel reactant stream outlet, a fuel reactant stream passage fluidly interconnecting the fuel reactant stream inlet and the fuel reactant stream outlet, an oxidant reactant stream inlet, an oxidant reactant stream outlet, and an oxidant reactant stream passage fluidly interconnecting the oxidant reactant stream inlet and the oxidant reactant stream outlet, a freeze tolerant system preferably further comprises means for purging water from at least one of the reactant stream passages. For example, the purging means can comprise a pump for circulating a gas stream through the at least one reactant stream passage, or a pressurized purge gas supply system.

Another freeze tolerant fuel cell electric power generation system comprises a fuel cell stack connectable to an external electrical circuit for supplying electric current to the external circuit. The stack comprises at least one fuel cell, the at least one fuel cell comprising a membrane electrode assembly comprising an anode, a cathode, and a water permeable ion exchange membrane interposed between the anode and the cathode. The system further comprises at least one conduit for flowing a fluid stream to the fuel cell stack, the conduit formed from electrically conductive material, wherein the external circuit comprises the conduit. In the system, preferably the fluid stream is a coolant stream.

DETAILED DESCRIPTION OF THE PREFERRED EMBODIMENTS

In the present method, the fuel and oxidant reactant gas streams are circulated within the fuel cell stack and electric current is supplied by the stack, while the stack has a core temperature below the freezing temperature of water. As used herein, the core temperature of the stack is below the freezing temperature of water when at least a portion of the membrane adjacent the electrocatalyst, in a membrane electrode assembly of at least one of the fuel cells which make up the stack, has a temperature below the freezing temperature of water.

In the method, when operation of the stack is commenced, heat generated by the exothermic fuel cell reaction and internal resistive heating caused by ohmic losses within the fuel cell stack contribute to raising the stack core temperature above the freezing temperature of water.

In the present method the reactant passages, including the manifolds and individual fuel cell reactant flow passages, within the stack are preferably purged with an essentially dry gas stream before the temperature of the stack is decreased to below the freezing temperature of water. Preferably a gas which is not reactive in the fuel cell environment, such as nitrogen, is used.

It has been found that the incorporation of compressible devices in the major water-carrying stack manifold headers accommodates the expansion of freezing water within the fuel cell stack. Suitable compressible devices include, for example, closed cell foam inserts, sealed tube-shaped flexible cushions containing a compressible fluid, or flexible inserts containing a fluid which is displaced (from the portion of insert located within the header) when the insert is compressed by freezing water. In addition, a compliant stack compression mechanism, such as, for example, a spring mechanism or a pneumatic or hydraulic piston, also accommodates the expansion of freezing water in the fluid flow field plate channels, thereby preventing damage to the flow field plates and neighboring structures.

Figure 1:
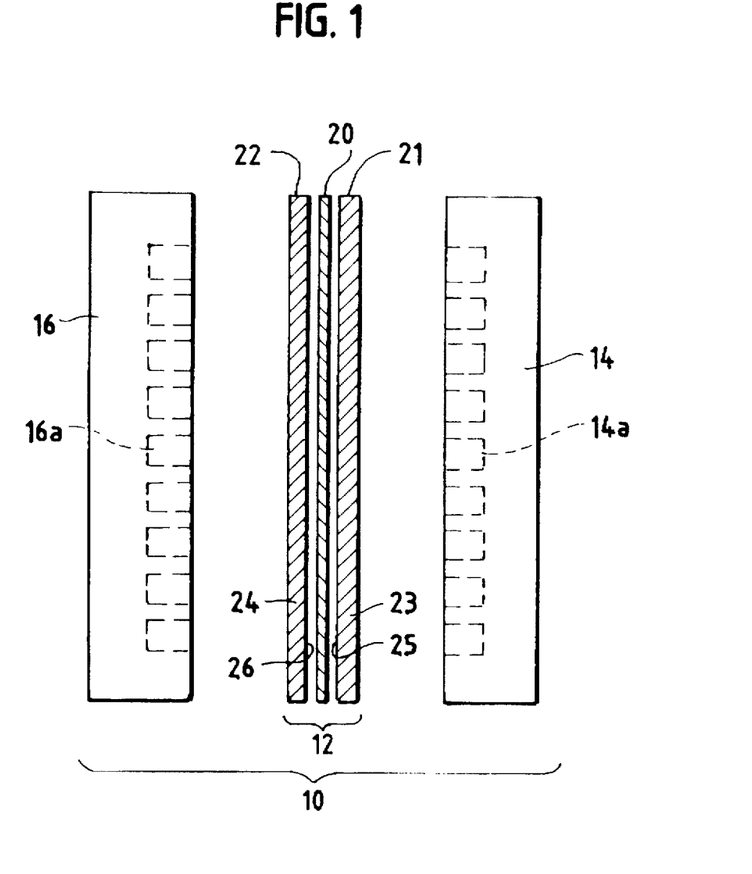
FIG. 1 is an exploded side view of a typical solid polymer electrochemical fuel cell with a membrane electrode assembly interposed between two fluid flow field plates.

FIG. 1 illustrates a typical fuel cell 10. Fuel cell 10 includes a membrane electrode assembly 12 interposed between anode flow field plate 14 and cathode flow field plate 16. Membrane electrode assembly 12 consists of an ion exchange membrane 20 interposed between two electrodes, namely, anode 21 and cathode 22. In conventional fuel cells, anode 21 and cathode 22 comprise a substrate of porous electrically conductive sheet material 23 and 24, respectively, for example, carbon fiber paper or carbon cloth. Each substrate has a thin layer of electrocatalyst 25 and 26, respectively, disposed on one surface thereof at the interface with membrane 20 to render each electrode electrochemically active.

As further shown in FIG. 1, anode flow field plate 14 has at least one fuel flow channel 14a engraved, milled or molded in its surface facing anode 21. Similarly, cathode separator plate 16 has at least one oxidant flow channel 16a engraved, milled or molded in its surface facing cathode 22. When assembled against the cooperating surfaces of electrodes 21 and 22, channels 14a and 16a form the reactant flow field passages for the fuel and oxidant, respectively. The flow field plates are electrically conductive.

Figure 2:
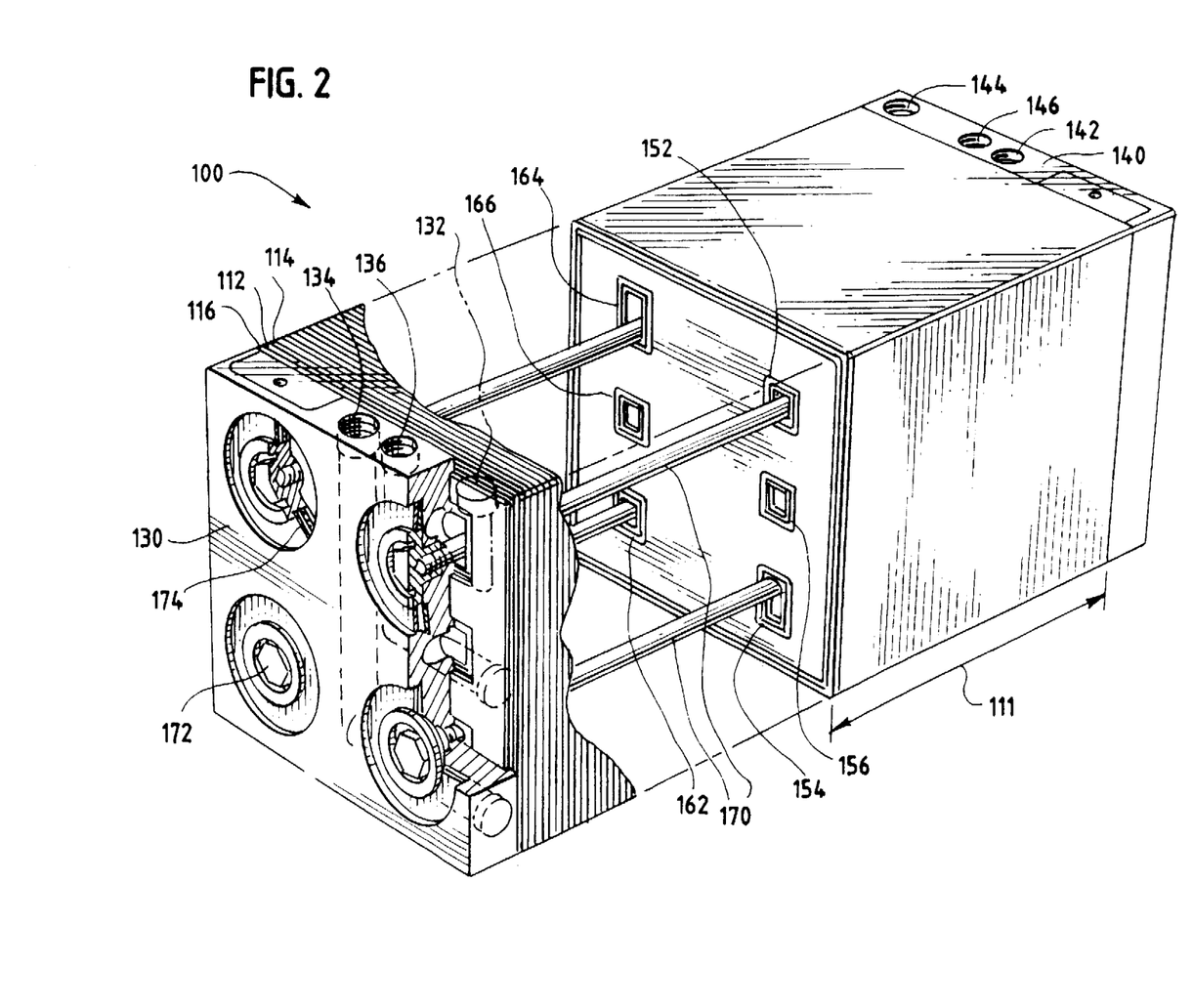
FIG. 2 is a perspective cut-away view of an electrochemical fuel cell stack.

Turning now to FIG. 2, a fuel cell stack 100 includes a plurality of fuel cell assemblies, a series of which is designated as 111 in FIG. 2. Each of the fuel cell assemblies includes a membrane electrode assembly 112 interposed between a pair of fluid flow field plates 114, 116. Fuel cell stack 100 also includes a first end plate 130 and a second end plate 140.

Plate 130 includes fluid inlet ports 132, 134, 136 for introducing fluid fuel, oxidant and coolant streams, respectively, to the stack. Plate 140 includes fluid outlet ports 142, 144, 146 for exhausting fluid fuel, oxidant and coolant streams, respectively, from the stack. The fluid outlet ports are fluidly connected to the corresponding fluid inlet ports via passages within the stack.

The fuel cell assemblies have a series of openings formed therein, which cooperate with corresponding openings in adjacent assemblies to form fluid manifolds 152, 154, 156, 162, 164, 166 within the stack 100. A fuel stream entering the stack via fuel inlet port 132 is directed to the individual fuel flow field plates via manifold 152. After passing through the fuel flow field plate channels, the fuel stream is collected in manifold 162 and exhausted from the stack via fuel outlet port 142. Similarly, an oxidant stream entering the stack via oxidant inlet port 134 is directed to individual oxidant flow field plates via manifold 154. After passing through the oxidant flow field plate channels, the oxidant stream is collected in manifold 164 and exhausted from the stack via oxidant outlet port 144. A fluid coolant (typically water) introduced via coolant inlet port 136 is directed to coolant plate assemblies (not shown) in the stack 100 via manifold 156. The coolant stream is collected in manifold 166 and exhausted from the stack via coolant outlet port 146. Coolant manifolds 156, 166 may be fitted with compliant means (not shown), such as tube cushions or inserts made of closed cell foam, to accommodate the expansion of freezing water.

Tie rods 170 extend between end plates 130 and 140 to compress and secure stack 100 in its assembled state with fastening nuts 172 disposed at opposite ends of each tie rod, and disc springs 174 interposed between the fastening nuts 172 and end plates 130, 140.

Figure 3:
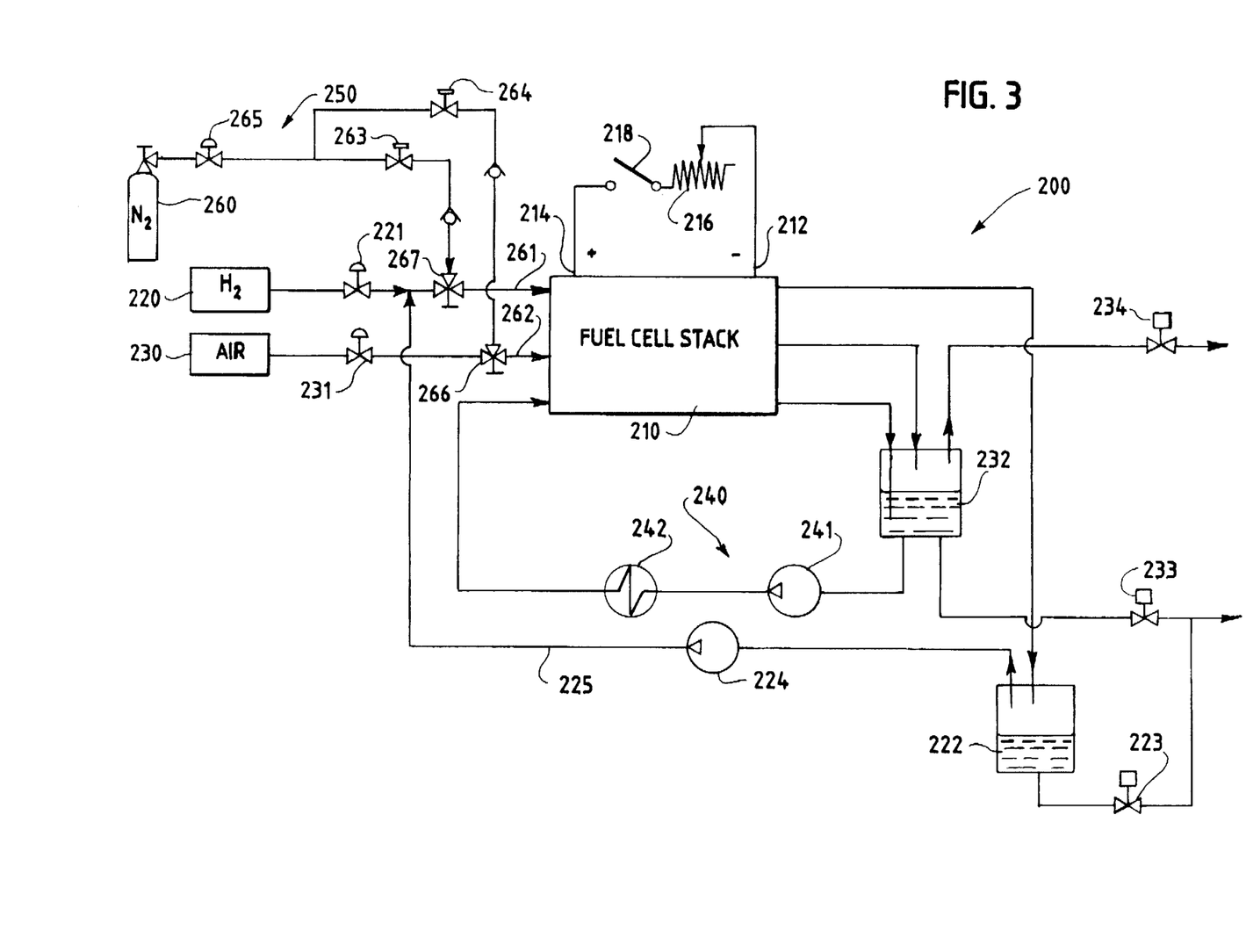
FIG. 3 is a schematic diagram of a fuel cell electric power generation system.

FIG. 3 is a schematic diagram of a fuel cell electric power generation system 200 comprising a fuel cell stack 210. The fuel cell stack 210 includes negative and positive bus plates 212, 214, respectively, to which an external circuit comprising a variable load 216 is electrically connectable by closing switch 218. The system includes a fuel (hydrogen) circuit, an oxidant (air) circuit, and a coolant water circuit. The reactant and coolant streams are circulated in the system in various conduits illustrated schematically in FIG. 3.

A hydrogen supply 220 is connected to the stack 210, and the pressure is controlled by pressure regulator 221. Water in the hydrogen stream exiting the stack 210 is accumulated in a knock drum 222, which can be drained by opening valve 223. Unreacted hydrogen is recirculated to stack 210 by a pump 224 in recirculation loop 225. An air supply 230 is connected to the stack 210, the pressure of which is controlled by pressure regulator 231. Water in the air stream exiting the stack 210 is accumulated in reservoir 232, which can be drained by opening valve 233, and the air stream is vented from the system via valve 234.

In the coolant water loop 240, water is pumped from reservoir 232 and circulated through stack 210 by pump 241. The temperature of the water is adjusted in a heat exchanger 242.

A purge system 250 is used to purge the hydrogen and oxidant passages in fuel cell stack 210 with low humidity, non-reactive gas. Flow of gas (dry nitrogen) from a purge gas supply 260 to the hydrogen and air inlet conduits 261, 262 is controlled by valves 263, 264 and three-way valves 266, 267. The nitrogen pressure is controlled by pressure regulator 265.

Figure 4:
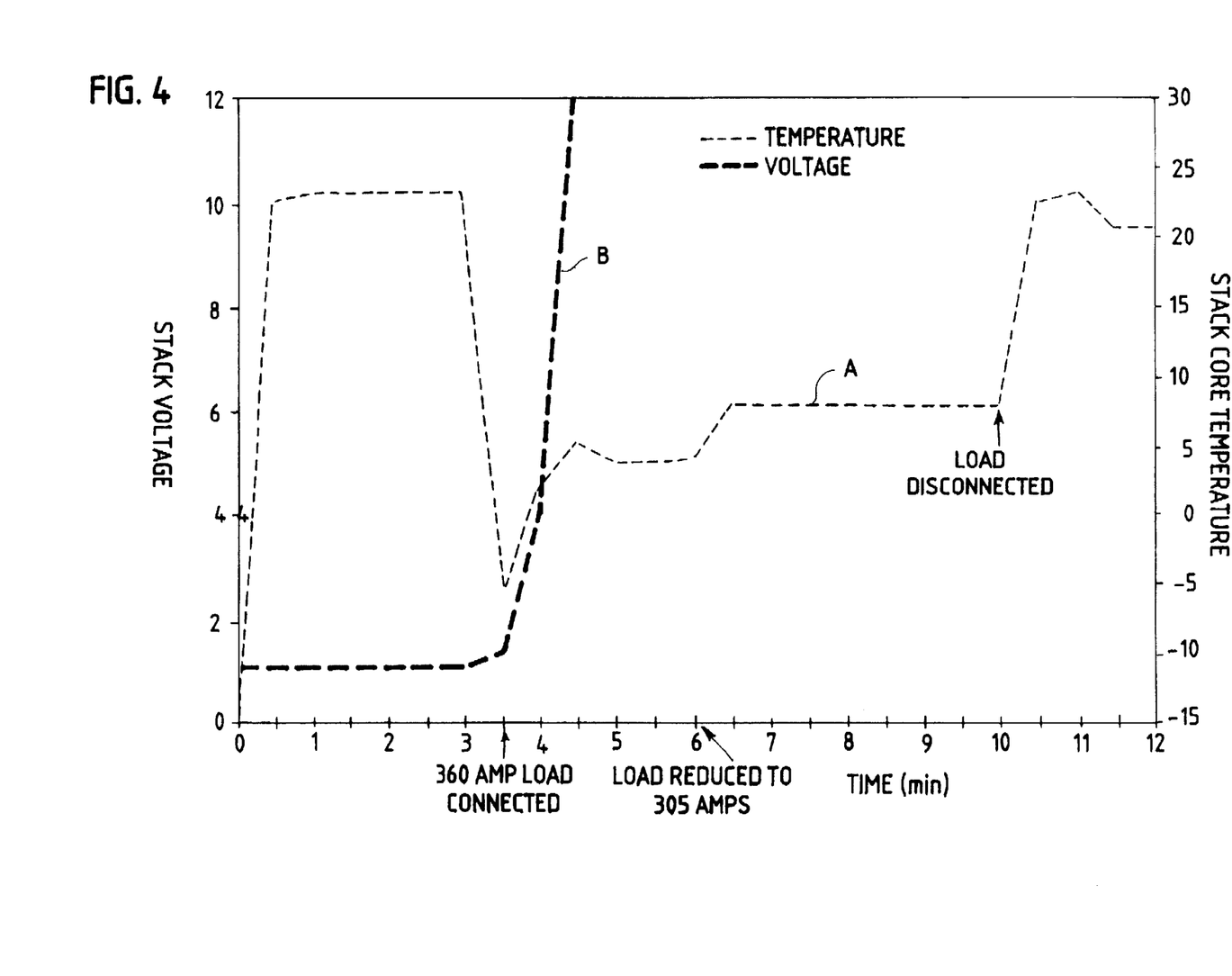
FIG. 4 is a composite plot of fuel cell stack voltage versus time in minutes (plot A) and fuel cell stack core temperature versus time in minutes (plot B) for a 10-cell stack, operation of which was commenced after the stack had equilibrated at a core temperature of −11° C.

FIG. 4 is a composite plot of fuel cell stack voltage versus time in minutes (plot A) and fuel cell stack core temperature versus time in minutes (plot B) for a 10-cell stack to which the flow of fuel and oxidant was restored after the stack had equilibrated at a core temperature of −11° C.

The stack had been operating previously, and therefore the reactant flow passages contained moist gases. Before decreasing the stack core temperature below the freezing temperature of water, the reactant and coolant water passages within the stack were purged by circulating dry, compressed air through them. The stack core temperature was then lowered below the freezing temperature of water by exposing the stack to a surrounding environment with a temperature below the freezing temperature of water. For the purposes of the examples described herein, the stack was typically placed in an insulated chamber, with the fluid and electrical connections to the stack fitted through the chamber walls. Cold nitrogen gas from a liquid nitrogen source was circulated through the chamber. The stack core temperature was measured using a thermocouple positioned in a thermally conductive plate located between two fuel cells in the center of the stack. Stack voltage, stack current and ambient temperature were also monitored.

When circulation of hydrogen and air through the stack was commenced at a stack core temperature of −11° C. (at time=0 minutes), the open circuit voltage was normal. A load (360 amp) was connected in the circuit after approximately three minutes, causing the stack core temperature to rise rapidly while the voltage decreased but recovered gradually. Once operation of the stack had commenced, the exothermic reaction of hydrogen and oxygen within the stack and the resistive heating due to internal ohmic losses caused the stack core temperature to rise.

Figure 5:
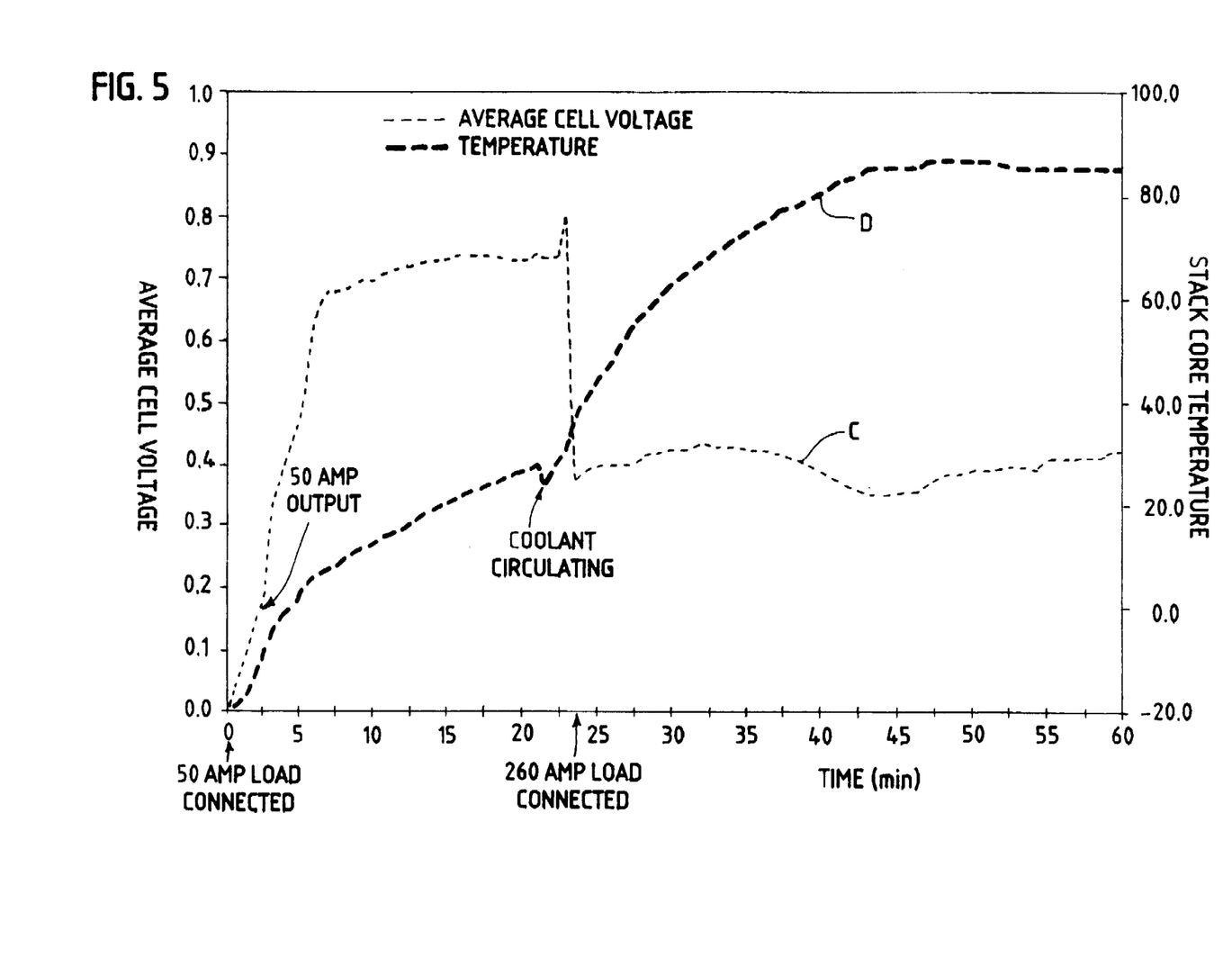
FIG. 5 is a composite plot of fuel cell stack voltage versus time in minutes (plot C) and fuel cell stack core temperature versus time in minutes (plot D) for a 4-cell stack, operation of which was commenced at a core temperature of −19° C.

FIG. 5 is a composite plot of fuel cell stack voltage versus time in minutes (plot C) and fuel cell stack core temperature versus time in minutes (plot D) for a 4-cell stack, operation of which was commenced at a core temperature of −19° C.

Again, as the stack had been operating previously, before decreasing the stack core temperature to −19° C., the reactant passages within the stack were purged by circulating dry, nitrogen. Coolant water remained in the coolant passages. Preferably the purge gas is an inert gas such as nitrogen. Circulation of hydrogen and air was commenced with a load (50 amp) connected. Approximately 2 minutes transpired before the output current reached 50 amps. The load was increased to 260 amps once the stack reached about 30° C., and the coolant pump was then activated. One cell in the stack was not operating properly; hence the lower than normal average cell voltages.

Figure 6:
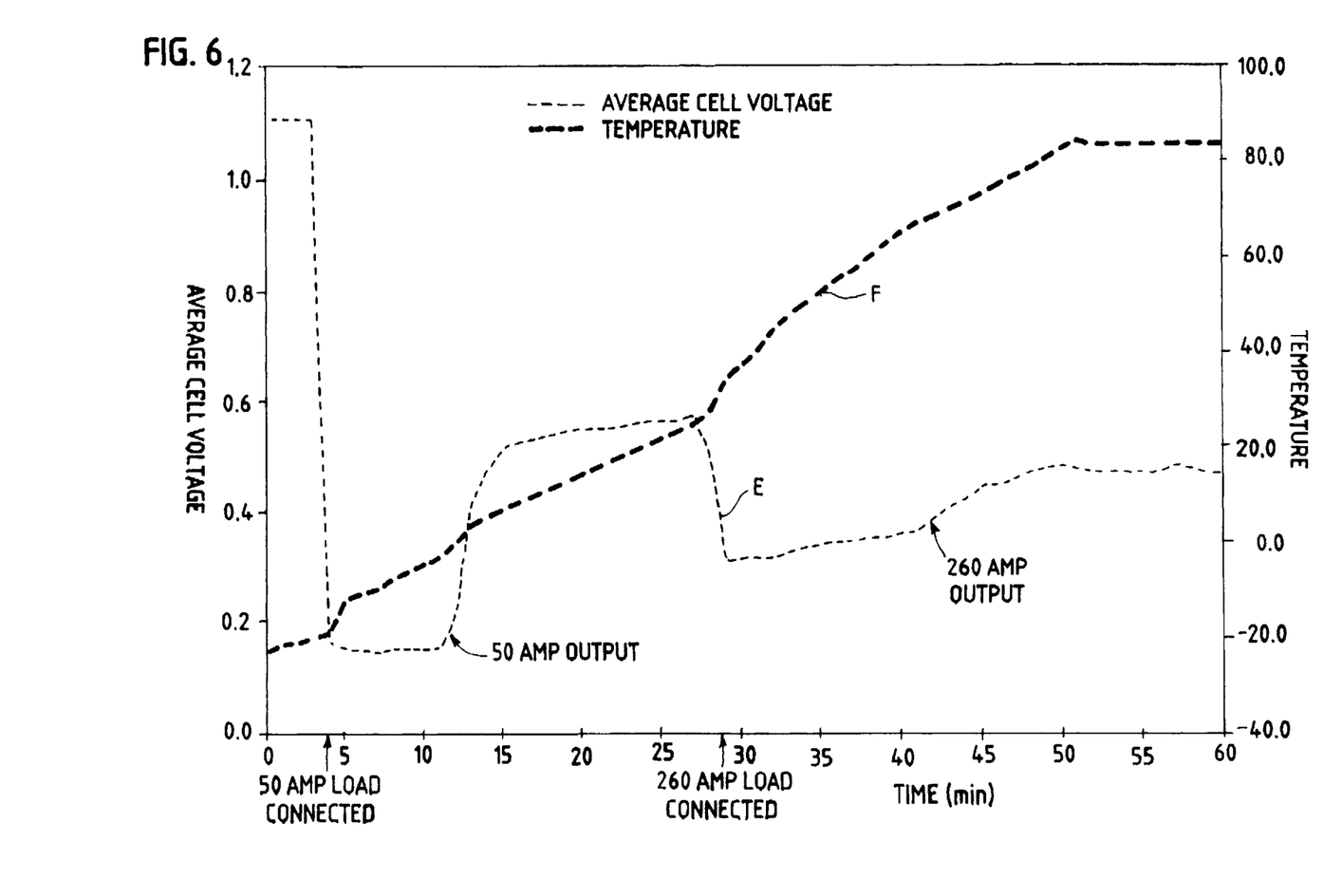
FIG. 6 is a composite plot of fuel cell stack voltage versus time in minutes (plot E) and fuel cell stack core temperature versus time in minutes (plot F) for a 4-cell stack, operation of which was commenced at a core temperature of −23° C.

FIG. 6 is a composite plot of fuel cell stack voltage versus time in minutes (plot E) and fuel cell stack core temperature versus time in minutes (plot F) for a 4-cell stack, operation of which was commenced at a core temperature of −23° C. The stack had been operated previously, but in this test the fuel and oxidant stream passages were not purged with dry gas before the stack was cooled, and the coolant passages contained water. The hydrogen stream did not begin to flow properly for about 4 minutes, possibly because the hydrogen stream passages were occluded with water or ice. The open circuit voltage was normal. A 50 amp load was applied after 4 minutes, and the stack produced about 45 amps for a few seconds. The output current then declined to about 15 amps for about 8 minutes, possibly due to formation of ice from product water. After about 12 minutes the stack core temperature was about 0° C. and the stack produced 50 amps steadily. After about 28 minutes (with the stack core temperature greater than 30° C. and coolant fluid circulating), the load was increased to 250 amps, and approximately 14 minutes transpired before the stack assumed this load.

It has been found advantageous to increase the current demanded from the stack by the external circuit (i.e. decreasing the resistance of the external circuit) in a gradual or stepwise manner rather than commencing operation of the stack in a low resistance, high current circuit initially. For example, as the stack provides the current demanded by the external circuit, the resistance of the circuit could be further decreased by another increment. In a control system, fuel cell voltages could be monitored, and the resistance of the external circuit could be decreased (and the current supplied by the stack increased) only when the cell voltages exceed a threshold value.

Membrane electrolytes, such as DuPont's NAFION® and Dow's experimental membrane (trade designation XUS 13204.10), appear to be sufficiently ionically conductive even at temperatures of −20° C. to permit the electrochemical reaction to occur within the fuel cells.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method of commencing operation of an electric power generation system comprising a fuel cell stack connectable to an external electrical circuit for supplying electric current to said external circuit, said stack comprising at least one fuel cell, said at least one fuel cell comprising a membrane electrode assembly comprising an anode, a cathode, and a water permeable ion exchange membrane interposed between said anode and said cathode, at least a portion of said membrane electrode assembly having a temperature below the freezing temperature of water, said system further comprising a fuel reactant stream and an oxidant reactant stream, each of said reactant streams being flowable to said fuel cell stack, the method comprising the step of:

supplying electric current from said fuel cell stack to said external circuit such that said temperature of said at least a portion of said membrane electrode assembly exceeds the freezing temperature of water.

2. The method of claim 1 wherein said step of supplying electric current to said external circuit comprises decreasing the resistance of said external circuit.

3. The method of claim 2 wherein said step of supplying electric current to said external circuit further comprises increasing the flow rate of at least one of said reactant streams.

4. The method of claim 1 wherein said external circuit comprises electrical means for heating at least a portion of said fuel cell stack.

5. The method of claim 4 wherein said electrical heating means is a resistor.

6. The method of claim 4 wherein said electrical heating means comprises at least one conduit formed from electrically conductive material, said at least one conduit carrying one of said reactant streams in said system.

7. The method of claim 4 wherein said electric current is further supplied to said electrical heating means from a battery.

8. The method of claim 1 wherein said system further comprises a coolant fluid stream being flowable in thermal contact with said fuel cell stack.

9. The method of claim 8 wherein said external circuit comprises electrical means for heating said coolant fluid stream.

10. The method of claim 9 wherein said electrical heating means is a resistor.

11. The method of claim 9 wherein said electrical heating means comprises at least one conduit formed from electrically conductive material, said at least one conduit carrying said coolant fluid stream in said system.

12. The method of claim 11 wherein said electric current is further supplied to said electrical heating means from a battery.

13. The method of claim 1 wherein said fuel cell stack further comprises at least one passage for flowing a coolant stream comprising water, said at least one coolant passage having compliant means associated therewith for accommodating the expansion of freezing water within said at least one coolant passage.

14. The method of claim 1 wherein the resistance of said external circuit is decreased incrementally as the voltage of said at least one fuel cell exceeds successive predetermined values.

15. A method of ceasing and commencing operation of an electric power generation system comprising a fuel cell stack connectable to an external electrical circuit for supplying electric current to said external circuit, said stack comprising at least one fuel cell, said at least one fuel cell comprising a membrane electrode assembly comprising an anode, a cathode, and a water permeable ion exchange membrane interposed between said anode and said cathode, said system further comprising a fuel reactant stream and an oxidant reactant stream, each of said reactant streams being flowable to said fuel cell stack, the method comprising the sequential steps of:

(a) interrupting the supply of electric current from said fuel cell stack to said external circuit;

(b) reducing the temperature of at least a portion of said membrane electrode assembly to below the freezing temperature of water;

(c) commencing the supply of electric current to said external circuit from said fuel cell stack, in which the temperature of said at least a portion of said membrane electrode assembly is below the freezing temperature of water, such that the temperature of said portion exceeds the freezing temperature of water.

16. The method of claim 15 wherein step (a) comprises increasing the resistance of said external circuit.

17. The method of claim 15 wherein step (a) comprises disconnecting said external circuit.

18. The method of claim 16 wherein step (a) further comprises decreasing the flow rate of at least one of said reactant streams.

19. The method of claim 15 wherein said fuel cell stack further comprises a fuel reactant stream inlet, a fuel reactant stream outlet, a fuel reactant stream passage fluidly interconnecting said fuel reactant stream inlet and said fuel reactant stream outlet, an oxidant reactant stream inlet, an oxidant reactant stream outlet, and an oxidant reactant stream passage fluidly interconnecting said oxidant reactant stream inlet and said oxidant reactant stream outlet, said method comprising an additional step between step (a) and step (b), said additional step comprising:

purging water from at least one of said reactant stream passages.

20. The method of claim 19 wherein water is purged from said at least one reactant stream passage by circulating a gas stream through said passage.

21. The method of claim 15 wherein said fuel cell stack further comprises a passage for flowing a coolant stream comprising water, said method comprising an additional step between step (a) and step (b), said additional step comprising:

purging water from said coolant stream passage.

22. The method of claim 21 wherein water is purged from said coolant stream passage by circulating a gas stream through said passage.

23. A freeze tolerant fuel cell electric power generation system comprising:

a fuel cell stack connectable to an external electrical circuit for supplying electric current to said external circuit, said stack comprising at least one fuel cell, said at least one fuel cell comprising a membrane electrode assembly comprising an anode, a cathode, and a water permeable ion exchange membrane interposed between said anode and said cathode, said stack further comprising at least one passage for flowing a coolant stream comprising water, said at least one coolant passage having compliant means associated therewith for accommodating said expansion of freezing water within said at least one coolant passage; and a fuel reactant stream and an oxidant reactant stream, each of said reactant streams being flowable to said fuel cell stack.

24. The system of claim 23 wherein stack further comprises:

a fuel reactant stream inlet, a fuel reactant stream outlet, a fuel reactant stream passage fluidly interconnecting said fuel reactant stream inlet and said fuel reactant stream outlet, an oxidant reactant stream inlet, an oxidant reactant stream outlet, and an oxidant reactant stream passage fluidly interconnecting said oxidant reactant stream inlet and said oxidant reactant stream outlet;

and wherein said system further comprises:

means for purging water from at least one of said reactant stream passages.

25. The system of claim 24 wherein said water purging means comprises a pressurized system for circulating a gas stream through said at least one reactant stream passage.

26. A freeze tolerant fuel cell electric power generation system comprising:

a fuel cell stack connectable to an external electrical circuit for supplying electric current to said external circuit, said stack comprising at least one fuel cell, said at least one fuel cell comprising a membrane electrode assembly comprising an anode, a cathode, and a water permeable ion exchange membrane interposed between said anode and said cathode;

at least one conduit for flowing a fluid stream to said fuel cell stack, said conduit formed from electrically conductive material, wherein said external circuit comprises said conduit.

27. The system of claim 26 wherein said fluid stream is a coolant stream.

* * * * *

UNITED STATES PATENT AND TRADEMARK OFFICE
CERTIFICATE OF CORRECTION

PATENT NO. : 5,798,186
DATED : June 7, 1996
INVENTOR(S) : Nicholas J. Fletcher, Gustav A. Boehm, and Eric G. Pow It is certified that error appears in the above-identified patent and that said Letters Patent is hereby corrected as shown below:

At Col. 1, line 48, delete "2e" and substitute therefor --$2e^-$--

At Col. 1, line 49, delete "2e" and substitute therefor --$2e^-$--

Signed and Sealed this

Fifteenth Day of December, 1998

*Attest:*

BRUCE LEHMAN

*Attesting Officer*  Commissioner of Patents and Trademarks